United States Patent
Breuer et al.

(10) Patent No.: US 9,272,616 B2
(45) Date of Patent: Mar. 1, 2016

(54) FILLER NECK FOR A FUEL TANK

(75) Inventors: Thorsten Breuer, Osnabrueck (DE); Christian Scharping, Tuelau (DE)

(73) Assignee: Volkswagen AG, Wolfsburg (DE)

(*) Notice: Subject to any disclaimer, the term of this patent is extended or adjusted under 35 U.S.C. 154(b) by 82 days.

(21) Appl. No.: 13/538,435

(22) Filed: Jun. 29, 2012

(65) Prior Publication Data
US 2013/0001226 A1 Jan. 3, 2013

(30) Foreign Application Priority Data

Jun. 29, 2011 (DE) .......................... 10 2011 107 367
Nov. 2, 2011 (DE) .......................... 10 2011 117 459

(51) Int. Cl.
*B60K 15/04* (2006.01)

(52) U.S. Cl.
CPC ......... *B60K 15/04* (2013.01); *B60K 2015/0483* (2013.01)

(58) Field of Classification Search
CPC .. B60K 15/03; B60K 15/03177; B60K 15/04; B60K 15/0406; B60K 15/0409; B60K 2015/04; B60K 2015/048; B60K 2015/0483; B60K 2015/049; B67D 7/32; B67D 7/34; B67D 7/42
USPC ................. 220/4.14, 86.2; 141/350
See application file for complete search history.

(56) References Cited

U.S. PATENT DOCUMENTS

| | | | | |
|---|---|---|---|---|
| 5,145,081 A | * | 9/1992 | Gravino ........................ | 220/86.2 |
| 6,382,270 B1 | * | 5/2002 | Gzik ............................ | 220/86.2 |
| 6,866,161 B2 | * | 3/2005 | Hagano ....................... | 220/259.1 |
| 7,967,041 B2 | * | 6/2011 | Groom et al. ................ | 141/367 |
| 2005/0000592 A1 | * | 1/2005 | Bartlett ........................ | 141/367 |
| 2005/0087261 A1 | * | 4/2005 | Durieux et al. .............. | 141/367 |
| 2005/0257852 A1 | * | 11/2005 | Ropert et al. ................ | 141/351 |
| 2006/0032552 A1 | * | 2/2006 | Hedevang .................... | 141/350 |
| 2007/0000571 A1 | * | 1/2007 | Jones et al. .................. | 141/286 |
| 2007/0125444 A1 | * | 6/2007 | Hagano et al. ............... | 141/350 |
| 2007/0261742 A1 | * | 11/2007 | Pozgainer .................... | 137/588 |
| 2008/0237231 A1 | * | 10/2008 | Feichtinger ................. | 220/86.2 |
| 2009/0145516 A1 | * | 6/2009 | Wells et al. .................. | 220/86.2 |
| 2011/0315682 A1 | | 12/2011 | Tsiberidis | |
| 2012/0181274 A1 | * | 7/2012 | Fetzer ......................... | 220/86.2 |

FOREIGN PATENT DOCUMENTS

| | | |
|---|---|---|
| DE | 10 2005 010 530 A1 | 9/2006 |
| DE | 10 2008 027 462 A1 | 12/2009 |
| DE | 102008027462 A1 * | 12/2009 |
| DE | 10 2008 039 150 A1 | 2/2010 |
| DE | 10 2009 009 998 A1 | 8/2010 |
| DE | 10 2009 049 482 A1 | 6/2011 |
| DE | 10 2009 056 512 A1 | 6/2011 |
| EP | 1264726 A2 * | 12/2002 |
| GB | 2391544 A * | 2/2004 |
| WO | WO 2007066296 A1 * | 6/2007 |
| WO | WO 2011080343 A1 * | 7/2011 |

* cited by examiner

*Primary Examiner* — Bryon Gehman
*Assistant Examiner* — Brijesh V. Patel
(74) *Attorney, Agent, or Firm* — Muncy, Geissler, Olds & Lowe, P.C.

(57) ABSTRACT

A filler neck for a fuel tank of a motor vehicle is provided. The filler neck comprises a filler pipe with a longitudinal axis and a circular cross section with an inner diameter. The filler neck further comprises a blocking element that is arranged inside the filler pipe and extends only inside a circle sector of a circle concentric to the circular cross section. The circle has a circle diameter that is smaller than the inner diameter. The circle sector has an angle at the center of less than 180°.

17 Claims, 5 Drawing Sheets

FILLER NECK FOR A FUEL TANK

This nonprovisional application claims priority to German Patent Application Nos. DE 10 2011 107 367.5 and DE 10 2011 117 459.5, which were filed in Germany on Jun. 29, 2011 and Nov. 7, 2011, respectively, and which are herein incorporated by reference.

BACKGROUND OF THE INVENTION

1. Field of the Invention

The present invention relates to a filler neck for a fuel tank, in particular filler necks for a fuel tank of a motor vehicle, which prevent incorrect fueling with an incorrect fuel type.

2. Description of the Background Art

Motor vehicles, for example, automobiles or transport vehicles, can be operated with gasoline or diesel depending on a type of installed internal combustion engine. In the event of incorrect fueling, for example, when a diesel vehicle is fueled with gasoline, considerable damage can be caused to the vehicle during the operation of the vehicle. Furthermore, substantial costs can be incurred by emptying the fuel system after an incorrect fueling.

Diesel tank filler necks of today's automobiles usually have an opening for the hose nozzle of more than 23 mm. A spout of a diesel hose nozzle has an outer diameter of approx. 23 mm. A spout of a gasoline hose nozzle has a smaller outer diameter than the diesel hose nozzle. In the case of gas tank filler necks, the opening diameter is only a few millimeters larger than the outer diameter of the gasoline hose nozzle. The opening of the gasoline tank filler neck is 20 mm, for example. Thus only a gasoline hose nozzle fits into the opening of the gasoline tank filler neck, whereby an incorrect fueling of the gasoline vehicle can be prevented. On the other hand, diesel hose nozzles as well as gasoline hose nozzles fit into the opening of the diesel tank filler neck.

In the prior art, therefore a plurality of methods and devices are known which are designed to prevent an incorrect fueling of a diesel vehicle with gasoline.

DE 10 2005 010 530 A1, for example, relates to a warning device for fueling vehicles with the correct fuel. The device comprises a transmitter, for example, an RFID chip, and a reader device. The transmitter is attached to the vehicle and the receiver is attached to a fueling device. When the fueling device approaches the vehicle, the fuel type stored in the transmitter is compared to the fuel of the fuel type that is stored in the reader device. If the fuel is identical, a green light-emitting diode is illuminated. If the fuel is not identical, a red light-emitting diode is illuminated. If the fueling represents a hazard, e.g., gasoline and diesel have been interchanged, an acoustic alarm and a vibration alarm in the reader device are triggered.

DE 10 2009 009 998 A1, which corresponds to US 20110315682, relates to a safety element for a diesel fuel tank to prevent adding the wrong fuel. An insert element for a diesel fuel tank can be installed in the filling opening of the tank for the purpose of a hose nozzle fueling with diesel fuel at the gas station side. The insert element has an elongated tubular securing element which can be fitted into the container opening with an inlet side and an outlet side, in which a molded part, which is elongated parallel to the securing element, is secured, the free end side of which projecting towards the inlet side in the outer diameter on the one hand is smaller than the inner diameter of the spout of a diesel hose nozzle, but on the other hand is larger than the inner diameter of a gas pump nozzle spout. Furthermore, an actuation element which can be displaced coaxially to the filling opening on the inner wall of the securing element is provided, which actuation element is arranged set back behind the end side of the molded part in the direction of the interior of the tank and is capable, when displaced in the direction of the interior of the tank, of actuating a closure flap which is arranged on the outlet side of the securing element.

DE 10 2008 039 150 A1 relates to a safety element for a diesel fuel tank for preventing incorrect fueling. A tubular molded part is provided, the outer diameter of which on the one hand is smaller than the inner diameter of a spout of a diesel pump nozzle, but on the other hand is larger than the inner diameter of a gas pump nozzle spout.

DE 10 2009 049 482 A1 relates to a diesel tank adapter. The diesel tank adapter functions such that the hose nozzle is pushed over a tank neck. The tank neck is thus inserted into the hose nozzle. The diesel tank adapter prevents an incorrect fueling with gasoline by utilizing the different diameters of the two types of hose nozzle.

DE 10 2009 056 512 A1 relates to a filling system for a fuel tank. The filling system has a filling opening and a blocking device for filler pipes provided for the filling opening, which blocking device in its design differs from that of a target filler pipe for a specific fluid. The blocking device has a blocking insert, which comprises a plug-on mandrel matching the target filler pipe and movable in a path-limited manner to the filling opening for the target filler pipe.

DE 10 2008 027 462 A1 relates to an insert element for a fuel tank, which is designed for filling with diesel fuels. The accidental filling of gasoline into the fuel tank can be prevented by means of the insert. The device has an inner flank, the one end of which is wider than the standardized inner diameter of a spout provided for gasoline pump nozzles, but smaller than the standardized inner diameter of a spout provided for diesel fuel pump nozzles.

With the protection against incorrect fueling known from the conventional art with the detection of the inner diameter of the spout of the hose nozzle, such as is known, for example, from DE 10 2009 009 998 A1 or DE 10 2008 027 462 A1, with shut-off mechanisms of the hose nozzle located in the spout, collisions can occur between the shut-off mechanism and the blocking element of the protection against incorrect fueling.

FIG. 1 shows diagrammatically a conventional filler neck 1 with a filler pipe 2 and a blade-like blocking element 3 arranged therein. Furthermore, FIG. 1 shows a cross-sectional view of a spout 4 of a hose nozzle with a shut-off mechanism 5 located in the spout 4. Depending on the position of the shut-off mechanism 5 on the inside of the spout 4 and depending on the insert angle of the spout 4 into the filler pipe 2, collisions can occur between the shut-off mechanism 5 and the blocking element 3. FIG. 2 shows a lateral cross-sectional view of the filler neck 1 and the spout 4 with the shut-off mechanism 5 arranged therein. FIGS. 3 and 4 show the collision situation, in which the shut-off mechanism 5 knocks against the blocking element 3, whereby an insertion of the spout 4 into the filler pipe 2 is prevented. FIG. 3 shows a cross-sectional view of the filler neck 1 and of the spout 4 and FIG. 4 shows a lateral cross-sectional view of the filler neck 1 and of the spout 4.

Although the position of the shut-off mechanism 5 inside the spout 4 is fixed, depending on a rotation angle with which a user tries to insert the spout 4 of the pump nozzle into the tank filler neck 1, the shut-off mechanism 5 can be located at any desired position based on the blocking element 3. A twisting of the spout 4 can occur in particular when the vehicle is not oriented optimally to the gas pump and the hose is guided over the vehicle or around the vehicle, for example, between the gas pump and the pump nozzle, whereby the pump nozzle is used in a correspondingly twisted manner.

SUMMARY OF THE INVENTION

It is therefore an object of the present invention to provide a protection against incorrect fueling, which ensures a reliable protection against incorrect fueling and at the same time renders possible an easy insertion of the spout into the filler neck, in particular at any desired angle.

According to an embodiment of the present invention, a filler neck for a fuel tank is provided, which comprises a filler pipe and a blocking element. The filler pipe has a longitudinal axis and a circular cross section with an inner diameter. "Circular" means, for example, that the filler pipe has an opening, the inner diameter of which in any direction deviates by no more than 5%, for example, than in any other diameter direction. The blocking element is arranged inside the filler pipe. The blocking element extends only inside a circle sector of a circle concentric to the circular cross section. This circle has a smaller circle diameter than the inner diameter of the filler pipe. The circle sector has an angle at the center of less than 180°. The circle diameter can correspond, for example, to an inner diameter of a spout of a hose nozzle or of a pump nozzle, which is to be useable in connection with the filler neck. For a protection against incorrect fueling for a diesel vehicle, the circle diameter, for example, can correspond to or be slightly smaller than an inner diameter of the spout of a diesel pump nozzle or of a diesel hose nozzle. This means that the spout that can be used in connection with the filler neck can be placed over the blocking element. Spouts with a smaller diameter, for example, a spout of a gas pump nozzle, however, cannot be placed over the blocking element. This can ensure a reliable protection against incorrect fueling. Since the blocking element extends in a circle sector with an angle at the center of less than 180°, a spout with a shut-off mechanism on the inside of the spout can be place at any desired angle in a range of more than 180° onto the blocking element, without the placement being prevented by a collision of the shut-off mechanism with the blocking element.

According to an embodiment, the blocking element extends along a section of a circle arc of the circle sector. A curvature of the blocking element along the circle arc is thus preset, whereby it can be prevented from being possible to place a spout with a non-matching inner diameter onto the blocking element. This can prevent an incorrect fueling with a spout with an incorrect inner diameter.

According to a further embodiment, the blocking element extends from a circle perimeter of the circle in the direction of a center point of the circle by more than a predetermined length, which can be determined as follows: firstly a sum of the inner diameter and the circle diameter is determined. This sum is halved. The length results from the difference between half the sum and an outer diameter of a spout that is not to be useable in connection with the filler neck. The blocking element thus extends so far from the circle perimeter of the circle in the direction of the center point of the circle that the spout that is not to be useable in connection with the filler neck no longer fits between the blocking element and the circular cross section of the filler pipe. An insertion of a spout, for example, a spout of a gasoline pump nozzle, can thus be reliably prevented, whereby an incorrect fueling can be prevented.

According to another embodiment, the blocking element is arranged in a stationary manner in the filler pipe. Due to the stationary arrangement, the blocking element can be attached in the filler pipe in a cost-effective manner.

According to a further embodiment, the filler neck further comprises a fuel filler flap, which is attached adjacent to the filler pipe along a flap axis. The fuel filler flap can be used, for example, to cover the filler neck when the vehicle is not being fueled. The blocking element is arranged in the filler pipe such that a perpendicular line extends from the flap axis of the fuel filler flap toward the center point of the circle through the circle sector in which the blocking element is arranged. In other words, the blocking element is arranged in the region of the filler pipe, which is located in the direction of the flap axis. Conventional pump nozzles have a slightly curved structure. That is, starting from the spout, a handle is arranged at a first angle to the spout and a fuel hose between the handle and a gas pump is attached to the handle at a second angle. The curvature of the pump nozzle is therefore determined by the first angle and the second angle. If the pump nozzle is used with the curvature downwards, in general the shut-off mechanism is likewise below inside the spout. Due to the curvature of the pump nozzle, the pump nozzle can be inserted into the filler neck only in a limited region, if the filler neck has a fuel filler flap, since outside the specific region the pump nozzle would collide with the fuel filler flap. Although the blocking element renders possible an insertion of a spout with a shut-off mechanism over a wide angle range, over a certain angle range it prevents an insertion of the spout with the shut-off mechanism. Since the blocking element is arranged in the region of the flap axis of the fuel filler flap, the spout with the shut-off mechanism can be inserted into the filler neck in all possible positions that are released by the fuel filler flap without a collision occurring between the blocking element and the shut-off mechanism.

According to an embodiment of the present invention, a further filler neck for a fuel tank is provided. The filler neck comprises a filler pipe with a longitudinal axis and a circular cross section with an inner diameter. The filler neck further comprises a blocking element, which is arranged inside the filler pipe and can be moved only inside a circle concentric to the circular cross section. The circle has a circle diameter that is smaller than the inner diameter of the circular cross section of the filler pipe. The blocking element comprises a flat section, which extends in the longitudinal direction of the filler pipe. A thickness of the flat section decreases in the longitudinal direction. Because the blocking element is located only inside the circle, a spout that is to be useable in connection with the filler neck can be pushed over the blocking element. However, a spout that has a smaller inner diameter and therefore is not to be useable in connection with the filler neck cannot be pushed over the blocking element, so that an incorrect fueling can be prevented. Because the blocking element is movable inside the circle, the spout can have a shut-off mechanism arranged on the inner diameter of the spout without the spout having to be inserted into the filler neck in a predetermined position or at a predetermined angle, since the blocking element can get out of the way due to its mobility in the event of an impending collision with the shut-off mechanism. This is facilitated in particular in that the blocking element comprises a flat section that extends in the longitudinal direction of the filler pipe and has a decreasing thickness in the longitudinal direction. The thickness of the flat section preferably decreases in the direction of a filling side at which a spout that can be used in connection with the filler neck can be inserted. If the spout is thus inserted with the shut-off mechanism into the filler pipe and there is a danger of a collision between the blocking element and the shut-off mechanism, the blocking element can be pushed away from the shut-off mechanism along the decreasing thickness of the flat section inside the filler pipe, so that the blocking element can get out of the way of the shut-off mechanism.

According to an embodiment, the flat section comprises a first and a second surface, which are spaced apart due to the thickness of the flat section. To reduce the thickness of the flat section, the first surface in a predetermined region can run obliquely to the first surface outside the predetermined region. Thus the flat section in the predetermined region is tapered on one side on the first surface. A collision of the shut-off mechanism with this tapered first surface leads to an evasive movement of the blocking element. Likewise, the second surface in a predetermined region can run obliquely to the second surface outside the predetermined region and thus the second surface can be tapered. Furthermore, the first surface as well as the second surface can be tapered, so that the flat section in the direction of the filling side runs to a point. Furthermore, the first surface in a predetermined region can run in a curved manner to the first surface outside the predetermined region. Alternatively or additionally, the second surface in a predetermined region can run in a curved manner to the second surface outside the predetermined region. A region rounded on one side or both sides at the end of the flat section can thus be arranged, whereby the flat section can be moved slightly to the side with a collision with the shut-off mechanism and thus can move out of the way of the shut-off mechanism.

According to a further embodiment, the flat section extends along the circle diameter and is pivoted about the longitudinal axis. In the event of a collision with the shut-off mechanism the blocking element can thereby easily move out of the way of the filler pipe by means of a rotational movement about a longitudinal axis. Furthermore, the spout can be inserted into the filler neck in any desired twisted manner, without the insertion being impeded by a collision between the blocking element and the shut-off mechanism.

Also, according to an embodiment of the present invention, a vehicle is provided, which comprises a filler neck and a fuel tank. The fuel tank is coupled to the filler neck such that fuel can run through the filler neck into the fuel tank. The filler neck comprises one of the filler necks described above, whereby an incorrect fueling of the vehicle with an incorrect type of fuel can be reliably prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
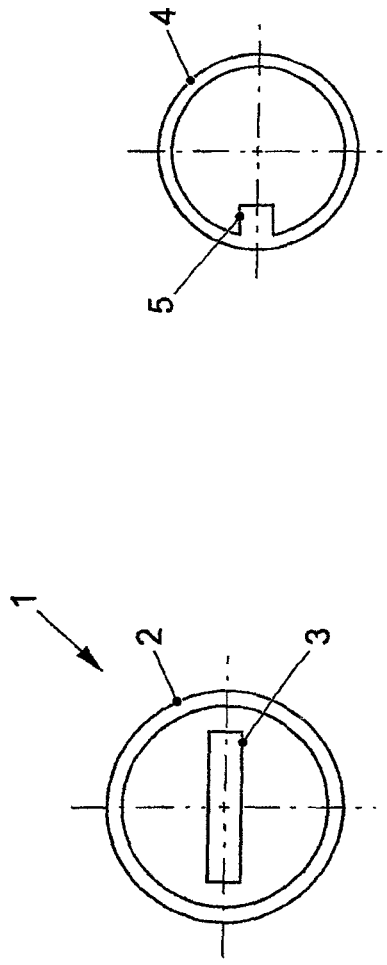
FIG. 1 shows a filler neck and a spout according to the conventional art in a diagrammatic cross-sectional representation.
Figure 2:
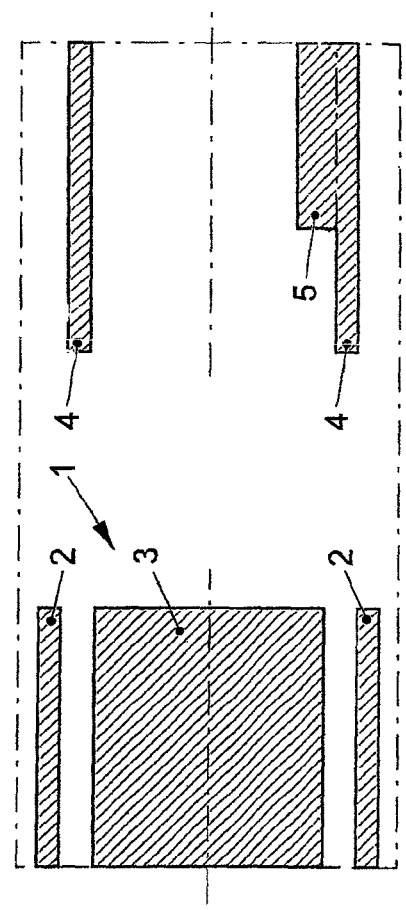
FIG. 2 shows the filler neck and the spout of FIG. 1 in a lateral diagrammatic cross-sectional representation.
Figure 3:
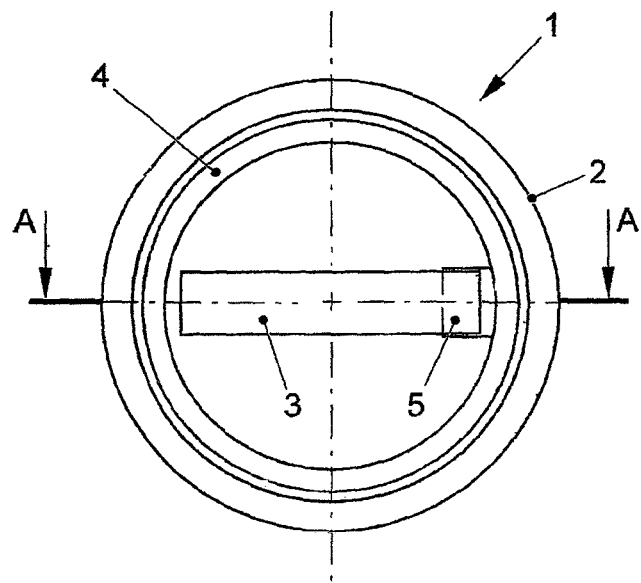
FIG. 3 shows the filler neck and the spout of FIG. 1 in a state partially inserted into one another in a cross-sectional representation.
Figure 4:
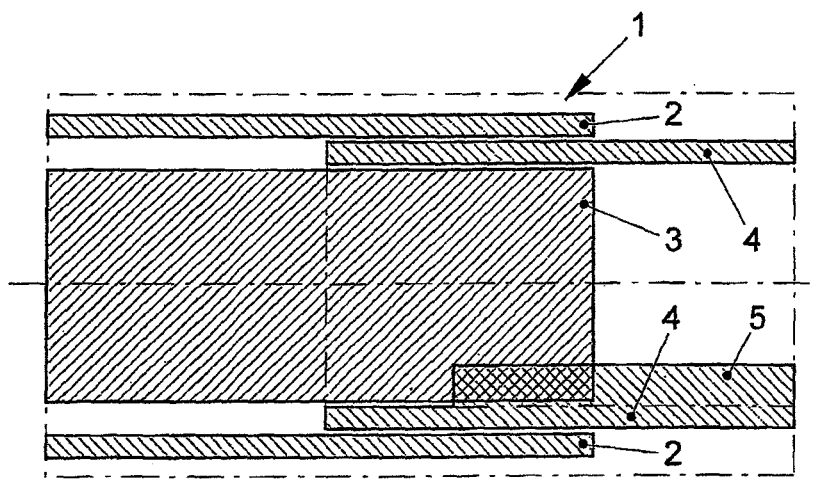
FIG. 4 shows the filler neck and the spout of FIG. 1 in a state partially inserted into one another in a lateral cross-sectional representation.
Figure 5:
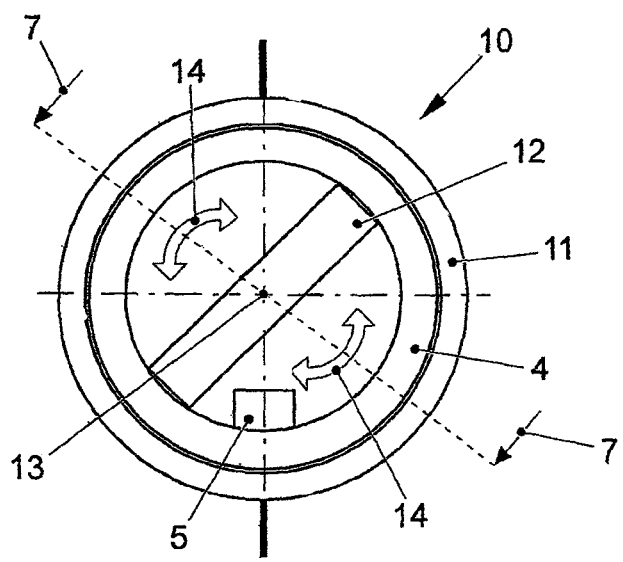
FIG. 5 shows a cross-sectional representation of a filler neck according to an embodiment of the present connection in connection with a spout.

FIG. 5 shows a cross-sectional view of a filler neck 10 for a motor vehicle. The filler neck 10 comprises a filler pipe 11 with a longitudinal axis 13 and a circular cross section with an inner diameter. The filler neck further comprises a blocking element 12, which is arranged in a rotatable manner about the longitudinal axis 13 inside the filler pipe 11. Furthermore, In FIG. 5 a spout 4 of a hose nozzle or a pump nozzle is shown in a cross-sectional view. An outer diameter of the spout 4 is smaller than the inner diameter of the filler pipe 11. The blocking element 12 extends diametrically in the radial direction from the longitudinal axis 13. The length of the blocking element 12 in the diametric direction is less than an inner diameter of the spout 4. It is thus possible for the spout 4 to be inserted into the filler pipe 11 and at the same time guided over the blocking element 12, i.e., for the blocking element 12 to be inserted into the spout 4. It can thus be ensured that only those spouts can be inserted into the filler neck which have an inner diameter larger than the diametric length of the blocking element 12 and an outer diameter smaller than the inner diameter of the filler pipe 11. It can thus be ensured, for example, with suitable selection of the dimensions that a spout of a diesel pump nozzle can be inserted into the filler neck 10, whereas a spout of a gasoline pump nozzle with a smaller inner diameter cannot be inserted into the filler neck 10. Furthermore, for example, it can be insured that pump nozzles via which a so-called "AdBlue" substance is conveyed cannot be inserted into the filler neck 10, since the inner diameter of such hose nozzles is likewise smaller than the length of the blocking element 12. A person skilled in the art is familiar with the name "AdBlue" and he knows that this is a water-clear synthetically produced 32.5 percent solution of high-purity urea in demineralized water, which is used for the aftertreatment of exhaust gases in a selective catalytic reduction (SCR) catalyst.

The blocking element 12, as described above, is pivoted about the longitudinal axis 13. This makes it possible for a spout 4 with a shut-off mechanism 5, which is arranged on an inside of the spout 4, can be inserted into the filler neck 10 in any desired twisted position. If a collision between the blocking element 12 and the shut-off mechanism 5 occurs, the blocking element 12 can be moved away in the direction of the arrows 14 out of the collision position so that an insertion of the spout 4 is not impeded by the blocking element 12 due to the collision with the shut-off mechanism 5.

Figure 6:
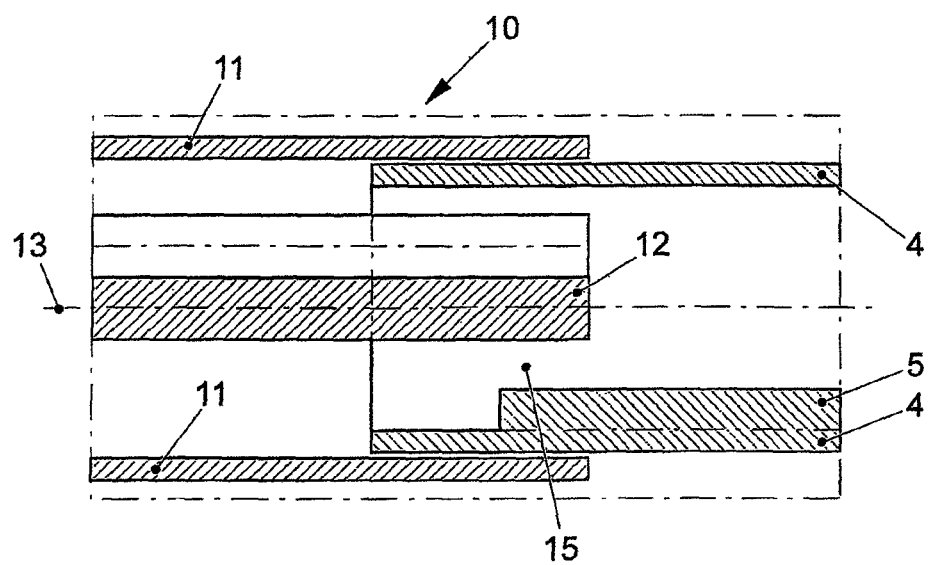
FIG. 6 shows a lateral cross-sectional representation of the filler neck of FIG. 5.
Figure 7:
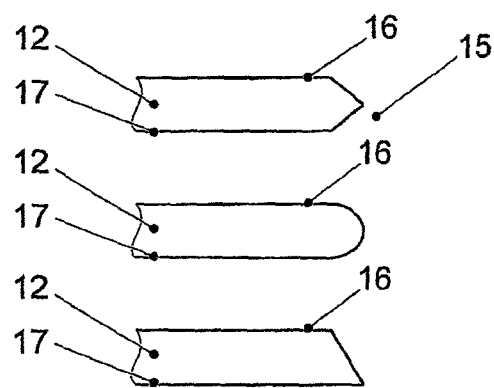
FIG. 7 shows details of a blocking element of a filler neck according to an embodiment of the present invention.

FIG. 6 shows the filler neck 10 together with the spout 4 in a lateral cross-sectional representation. The blocking element 12 is supported around the longitudinal axis 13 inside the filler pipe 11. The spout 4 is partially inserted into the filler pipe 11 and the blocking element 12 is located in a position such that it does not collide with the shut-off mechanism 5 at the inside of the spout 4. In the position shown in FIG. 6, the spout 4 can be inserted unhindered deeper into the filler neck 10. The filler pipe 11 shown in FIG. 6 has on its side shown on the right in FIG. 6 a filling side 15, into which the spout 4 is inserted. Depending on the position of the blocking element 12, during the insertion of the spout 4 a collision can occur between the blocking element 12 and the shut-off mechanism 5, which can be cancelled by rotating away the blocking element 12. In order to facilitate an evasion of the blocking element in the event of a collision, the end of the blocking element 12 can be rounded or pointed at its end on the filling side 15, as is shown, for example, in FIG. 7. FIG. 7 shows sectional representations of the blocking element 12 on the filling side 15 along a cutting plane 7 shown in FIG. 5.

The blocking element 12 has a first surface 16 and a second surface 17. In an end region on the filling side 16, the first and/or second surface 16, 17 is tapered or rounded, whereby the blocking element on the filling side 15 is given a pointed or rounded end, as is shown in FIG. 7.

To sum up, the filler neck 10 is a protection against incorrect fueling with detection of the inner diameter of the spout 4 of the hose nozzle, wherein the hose nozzle spout 4 is guided over the blocking element 12. The blocking element 12 is embodied in a rotatable manner and has a geometry that supports and renders possible a rotating away of the blocking element 12 from geometries lying in the valve spout 4, such as e.g. the shut-off mechanism 5. The blocking element 12 is accordingly embodied such that hose nozzles, in particular diesel hose nozzles, can be guided over it. Hose nozzles that are not to be used in connection with the filler neck, in particular gas hose nozzles or "AdBlue" hose nozzles, collide with the blocking element 12 and cannot be guided or pushed over the blocking element 12. Moreover, hose nozzles of this type cannot be inserted or positioned past the blocking element 12 inside the filler pipe 11.

Figure 8:
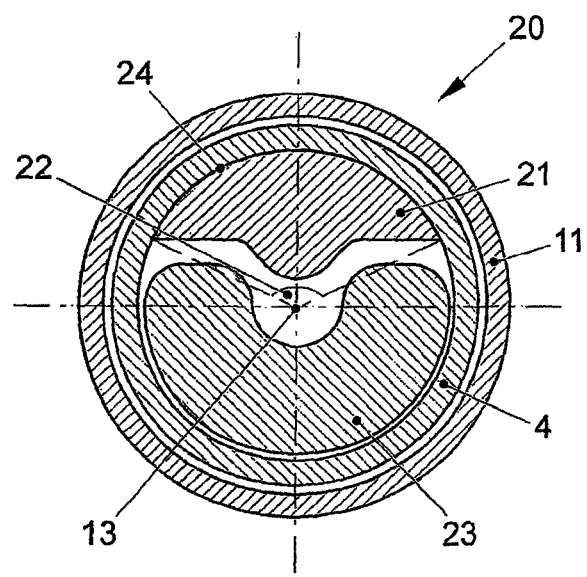
FIG. 8 shows a cross-sectional representation of a filler neck according to a further embodiment of the present invention in connection with a spout.

FIG. 8 shows in a cross-sectional representation a further filler neck 20 with a filler pipe 11 and a blocking element that is arranged inside the filler pipe. A precise embodiment of the blocking element is not shown in FIG. 8, instead a region 21 is shown which can be taken up by the blocking element. The blocking element can take up the entire region 21, for example. The region 21 is located inside a circle, which is delimited in the radial direction by an inner diameter of a spout 4 to be inserted into the filler pipe 11. The region 21 is located inside a circle segment of the circle defined by the inner diameter of the spout 4, with an angle at the center 22 of less than 180°, i.e., a region 23 is kept free by the angle at the center 22 limited to less than 180°, in which region, for example, a shut-off mechanism 5 can be arranged as desired on the inside of the spout 4. In this manner it is ensured that contact with the blocking element cannot occur with the insertion of a hose nozzle in a wide angular range. The blocking element can extend in particular along a circle arc 24, whereby a spout 4 with a smaller diameter can be prevented from being guided over the blocking element. Furthermore, the blocking element can extend from the circle arc 24 so far in the direction of the center point of the filler pipe 11 that a remaining distance between the blocking element and any point on the inside of the filler pipe 11 is smaller than an outer diameter of a spout that is not to be useable in connection with the filler neck 20. It can be ensured thereby that, for example, a spout of a gas hose nozzle cannot be inserted into the remaining space next to the blocking element in the filler pipe 11.

Figure 9:
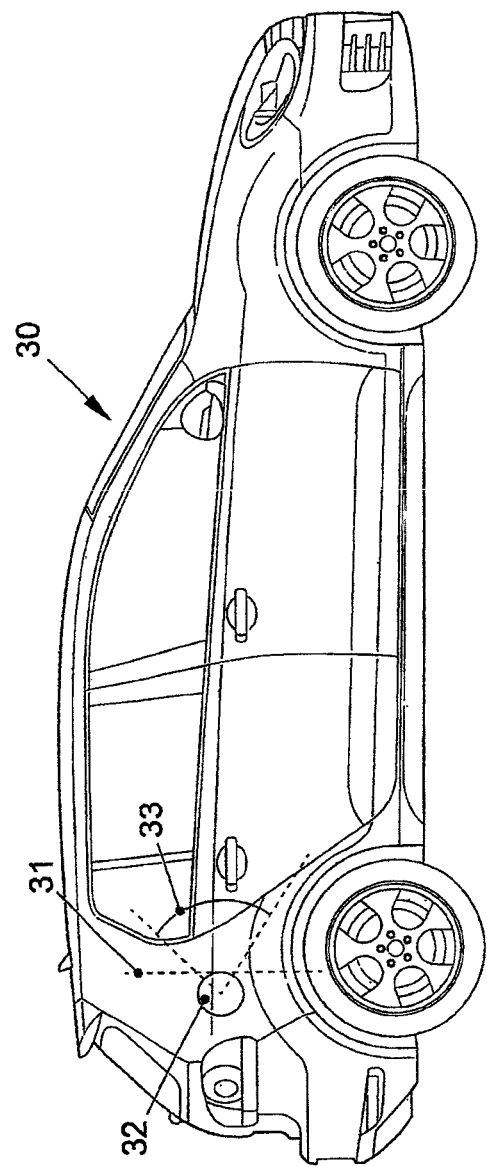
FIG. 9 shows a vehicle according to an embodiment of the present invention.

FIG. 9 shows a vehicle 30 with a filler neck arranged behind a fuel filler flap 32, which filler neck, for example, can comprise the previously described filler neck 10 or the previously described filler neck 20. The fuel filler flap 32 can be folded up along a flap axis 31, in order to render access possible to the filler neck 10, 20. The blocking element, which is arranged in a stationary manner in the region 21 of the filler neck 20, can be arranged, for example, inside the filler pipe 11 adjacent to the flap axis 32. Since when the fuel filler flap 32 is opened a hose nozzle cannot be arranged in an angular range 33 anyway in which the pump nozzle would collide with the opened fuel filler flap 32, the blocking element can be arranged in the angular range 33 in this region even with the usual arrangement of the shut-off mechanism in the spout, without collisions being able to occur between the blocking element and the shut-off mechanism.

To sum up, the blocking element, which was described with reference to FIG. 8, is stationary and embodied such that the region in which geometries lying in the hose nozzle spout, for example, a shut-off mechanism, can be located is not blocked so that collisions cannot occur. Furthermore, the blocking element is embodied such that a spout of a hose nozzle, in particular of a diesel hose nozzle, can be guided over it. Furthermore, it is embodied such that hose nozzles that are not to be used in connection with the filler neck, for example, gasoline hose nozzles or "AdBlue" hose nozzles, can collide with the blocking element and cannot be guided or pushed over the blocking element and cannot be positioned past the blocking element. The filler neck can be a fixed component of the tank system of the vehicle, i.e. the filler neck is a fixedly installed part, which was installed by the manufacturer of the vehicle and supplied with the vehicle. Alternatively, the filler neck can be an accessory part that is retrofitted by a vehicle user or a repair shop into an existing tank system of the vehicle in order to avoid an incorrect fueling with a fuel type unsuitable for the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A filler neck for a fuel tank, the filler neck comprising:
   a filler pipe with a longitudinal axis and a circular cross section with an inner diameter;
   a blocking element that is arranged inside the filler pipe, the blocking element being configured to extend across and only inside a circle sector of a circle concentric to the circular cross section, the circle having a smaller circle diameter than the inner diameter of the filler pipe, and the circle sector having an angle at a center of less than 180°; and
   a fuel filler flap, which is attached adjacent to the filler pipe along a flap axis,
   wherein a perpendicular line runs from the flap axis to the center of the circle sector in which the blocking element is arranged,
   wherein the blocking element is composed of a single rectangular element, and
   wherein the blocking element is pivotable about the longitudinal axis,
   wherein the blocking element comprises a flat section having a first surface and a second surface, which are spaced apart by a thickness of the flat section, wherein:
   the first surface in a region extends obliquely to the first surface outside the region, or the second surface in the region extends obliquely to the second surface outside the region, or the first surface in the region extends in a curved manner to the first surface outside the region, or the second surface in the region extends in a curved manner to the second surface outside the region.

2. The filler neck according to claim 1, wherein the blocking element extends along a section of a circle arc of the circle sector.

3. A vehicle, comprising:
a filler neck according to claim 1; and
a fuel tank that is coupled to the filler neck.

4. The filler neck according to claim 1, wherein the blocking element comprises a rectangular blocking element.

5. The filler neck according to claim 1, wherein the blocking element is rotatable within the filler pipe.

6. The filler neck according to claim 1, wherein the blocking element extends across an entirety of the circle sector.

7. The filler neck according to claim 1, wherein the blocking element comprises a continuous rectangular element extending across an entirety of the circle sector.

8. The filler neck according to claim 1, wherein the blocking element extends diametrically in a radial direction from the longitudinal axis.

9. The filler neck according to claim 1, wherein the blocking element comprises a flat section, a thickness of the flat section decreasing in the longitudinal direction.

10. The filler neck according to claim 1, wherein the blocking element has a first surface and a second surface, and
wherein in an end region of the first surface or the second surface or both of the first surface and the second surface are tapered or rounded.

11. A filler neck for a fuel tank, comprising:
a filler pipe with a longitudinal axis and a circular cross section with an inner diameter;
a blocking element that is arranged inside the filler pipe and is movable only inside a circle concentric to the circular cross section, the circle having a circle diameter smaller than the inner diameter of the filler pipe, the blocking element extending across the circle; and
a fuel filler flap, which is attached adjacent to the filler pipe along a flap axis,
wherein a perpendicular line runs from the flap axis to the center of the circle sector in which the blocking element is arranged,
wherein the blocking element comprises a flat section, which extends in a longitudinal direction of the filler pipe,
wherein a thickness of the flat section decreases in the longitudinal direction,
wherein the blocking element is pivotable about the longitudinal axis,
wherein the flat section has a first surface and a second surface, which are spaced apart by a thickness of the flat section, wherein:
the first surface in a region extends obliquely to the first surface outside the region, or the second surface in the region extends obliquely to the second surface outside the region, or the first surface in the region extends in a curved manner to the first surface outside the region, or the second surface in the region extends in a curved manner to the second surface outside the region.

12. The filler neck according to claim 11, wherein the filler pipe has a filling side at which a spout that is usable in connection with the filler neck is configured to be insertable, and, wherein a thickness of the flat section decreases in a direction of the filling side.

13. The filler neck according to claim 11, wherein the flat section extends in a longitudinal direction and along the circle diameter and is pivoted about the longitudinal axis.

14. The filler neck according to claim 11, wherein the circle diameter is smaller than an inner diameter of a spout that is to be useable in connection with the filler neck.

15. The filler neck according to claim 11, wherein the inner diameter is larger than an outer diameter of a spout that is to be useable in connection with the filler neck.

16. A vehicle comprising:
a filler neck according to claim 11; and
a fuel tank that is coupled to the filler neck.

17. A filler neck for a fuel tank, comprising:
a filler pipe having a longitudinal axis and a circular cross section having an inner diameter, the filler pipe having a circular opening defined by the inner diameter;
a rectangular blocking element rotatably arranged within the circular opening of the filler pipe, the rectangular blocking element comprising a first end and a second end and having a length that is less than the inner diameter of the filler pipe, the rectangular blocking element being composed of a single rectangular element;
a circular gap disposed between an inner wall of the filler pipe and each of the first end and the second end of the rectangular blocking element, the circular gap configured to receive a spout of a fuel hose; and
a fuel filler flap, which is attached adjacent to the filler pipe along a flap axis,
wherein a perpendicular line runs from the flap axis to the center of the circle sector in which the blocking element is arranged,
wherein the blocking element is pivotable about the longitudinal axis,
wherein the blocking element comprises a flat section having a first surface and a second surface, which are spaced apart by a thickness of the flat section, wherein:
the first surface in a region extends obliquely to the first surface outside the region, or the second surface in the region extends obliquely to the second surface outside the region, or the first surface in the region extends in a curved manner to the first surface outside the region, or the second surface in the region extends in a curved manner to the second surface outside the region.

* * * * *